Figure 1:
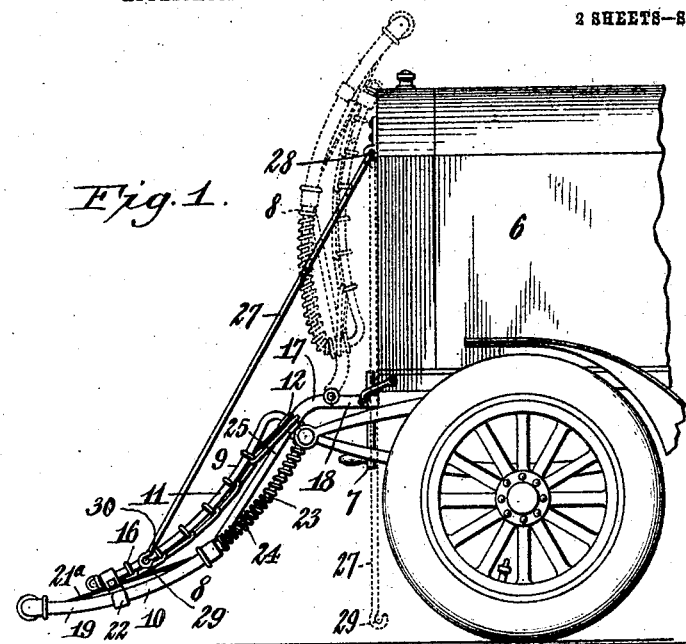

No. 847,204.   
PATENTED MAR. 12, 1907.

F. ROEDER.
VEHICLE FENDER.
APPLICATION FILED OCT. 18, 1906.

2 SHEETS—SHEET 1.

Witnesses:  
Christ Feinle.  
Harry D. Rapp.

Fredrick Roeder, Inventor.  
By Emil Neuhart,  
Attorney.

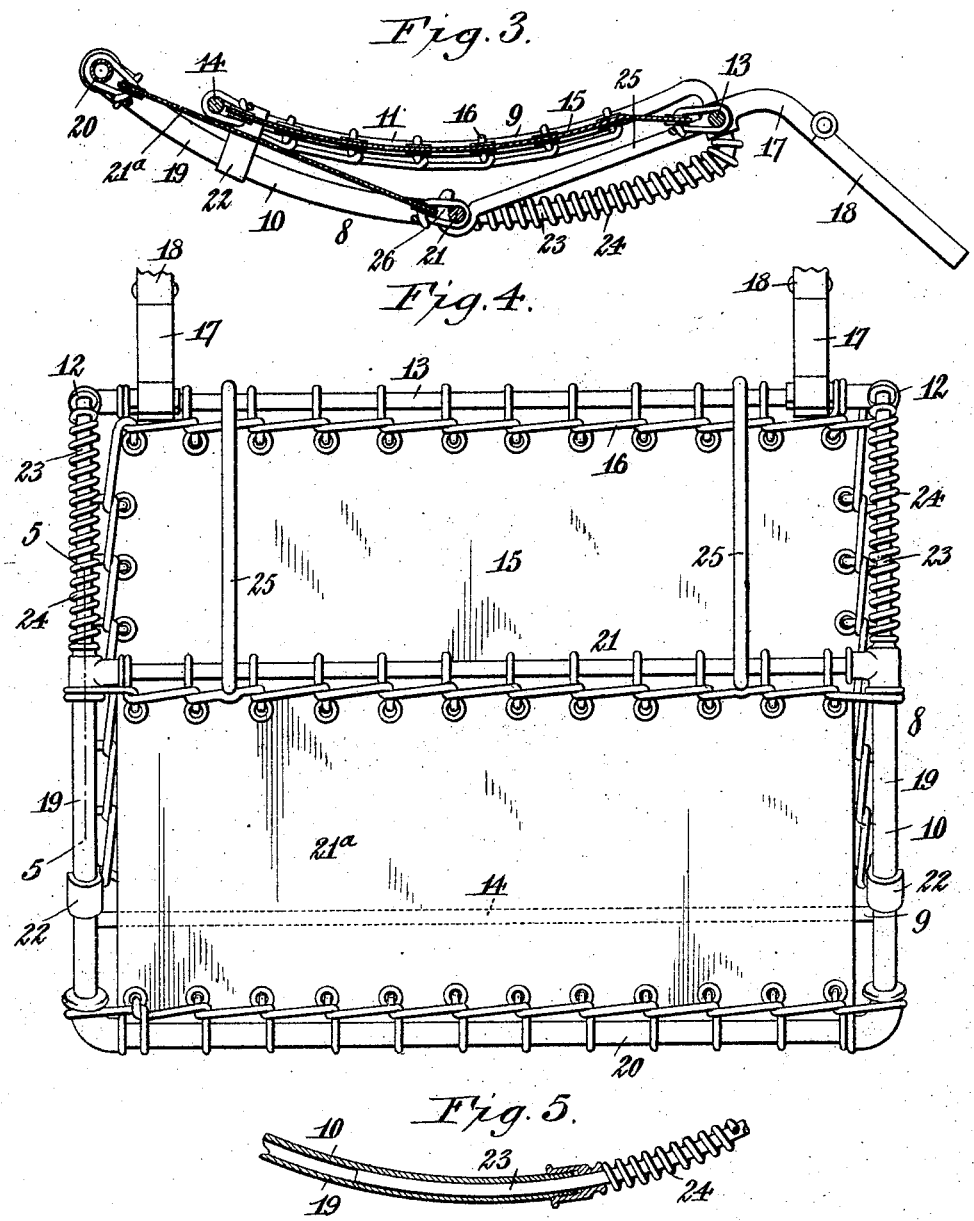

UNITED STATES PATENT OFFICE.

FREDRICK ROEDER, OF BUFFALO, NEW YORK.

VEHICLE-FENDER.

No. 847,204.  Specification of Letters Patent.  Patented March 12, 1907.

Application filed October 18, 1906. Serial No. 339,516.

*To all whom it may concern:*

Be it known that I, FREDRICK ROEDER, a citizen of the United States, residing at Buffalo, in the county of Erie and State of New York, have invented certain new and useful Improvements in Vehicle-Fenders, of which the following is a specification.

My invention relates to vehicle-fenders, and more particularly to a fender adapted for use on automobiles.

The object of my invention is the production of a simple and efficient fender which can be attached to any vehicle and which provides for automatically extending the fender when striking a person or object in the path of the vehicle, so that the person or object struck will fall into the basket-like receptacle formed when the fender is extended.

To this end the invention consists in the construction, arrangement, and combination of parts to be hereinafter described, and particularly pointed out in the appended claims.

Referring to the drawings, corresponding numerals of reference refer to corresponding parts in the several figures.

Figure 2:
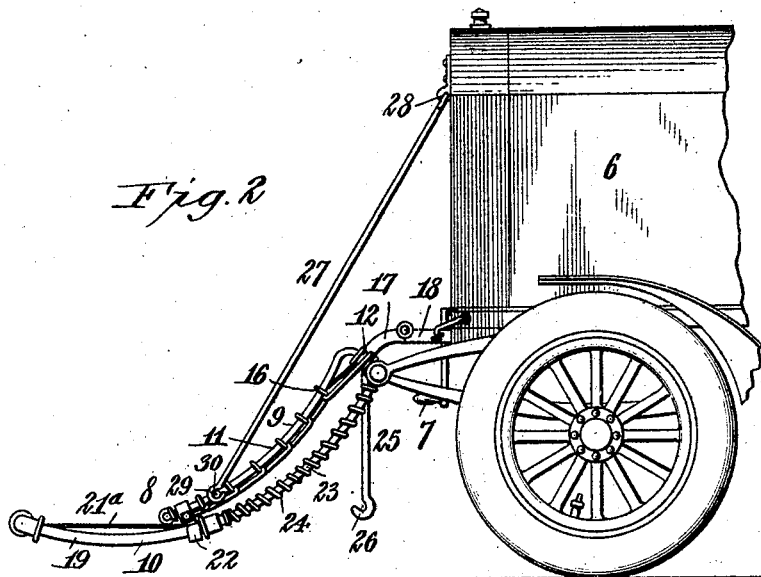

Figure 1 is a side elevation of my improved fender in contracted condition and applied to the front end of an automobile, the fender being shown in dotted lines in elevated position to render the operating-crank of the engine-shaft accessible. Fig. 2 is a similar view showing the fender extended. Fig. 3 is an enlarged central longitudinal section of the fender. Fig. 4 is a bottom view showing the fender in contracted or normal condition. Fig. 5 is a longitudinal section through one of the curved side bars of the slidable frame of the fender and the guide-rod therefor, taken on line 5 5, Fig. 4.

The reference-numeral 6 designates the forward end of an automobile of common type, having a crank-handle 7 for setting the engine in motion.

8 designates my improved fender or guard, which consists of two frames 9 and 10. Frame 9 is pivotally attached to the automobile or other vehicle to which the fender may be applied, so that it may be swung upward into the position shown in broken lines in Fig. 1, while frame 10 is carried by frame 9 and adapted for sliding movement thereon.

Frame 9 is stationary and comprises curved side bars 11, bent downward at their rear ends for connection to castings 12, a rear cross-bar 13, also connected at its ends to said castings, and a front cross-bar 14, thus forming a rectangular open space within the frame, which is occupied by a canvas 15, fastened by cord 16 to the bars 11, 13, and 14, forming the stationary frame of the fender. If desired, netting or any other suitable flexible material may be substituted for the canvas, it being the purpose to fill the space within said frame with a soft flexible material, so that a person struck by the fender and landing thereon will not become injured. Secured to the rear cross-bar 13 are supporting-arms 17, which have pivotal connection with fastening-pieces 18 to be secured in any suitable manner to the vehicle.

Frame 10, which may be termed a "slidable" frame, comprises hollow curved side bars 19, a front cross-bar 20, and a rear cross-bar 21, which, like the bars constituting the stationary frame, provide a rectangular space between said bars occupied by a canvas 21$^a$, fastened to the front and rear cross-bars only. Attached to the side bars of the stationary frame at or near the front ends thereof are hangers 22, having their lower ends formed into U shape to receive and guide the side bars of the slidable frame.

Attached to the castings 12 of the stationary frame are curved guide-rods 23, which enter the hollow side bars of the slidable frame, and surrounding said rods and bearing with opposite ends against said castings and the rear end of the slidable frame, respectively, are spiral springs 24, which act to force said slidable frame outward or forward into its projected position. Normally the slidable frame is maintained in its inner or rear position by retainer-levers 25, pivotally attached to the rear cross-bar of the stationary frame and having at their outer ends upwardly-opening hooks 26, which engage the rear cross-bar of the slidable frame.

In order to support the fender the proper distance from the ground, braces 27 are provided, which are pivotally secured to the vehicle at 28 and detachably connected to the fender by having at their lower ends hooks 29, that engage pins 30 on the side bars of the stationary frame. This arrangement permits the fender to be swung upward into the position shown in the dotted lines, Fig. 1, and when the fender is thus elevated the braces 27 hang in a perpendicular position.

When the fender comes in contact with a person or other object in the path of the vehicle, the slidable frame, which normally extends a short distance beyond the front of the stationary frame, is forced rearward against the action of springs 24 and releases the retainer-levers 25 from the rear cross-bar of said slidable frame, whereupon the latter is forced outward by said springs to the position shown in Fig. 2. By reason of the side bars of the fender-frames being curved a basket-like receptacle is formed when the fender is extended, into which the person or object struck falls without being injured.

Having thus described my invention, what I claim is—

1. In a vehicle-fender, the combination of a relatively stationary frame, a slidable frame supported on said stationary frame and projecting slightly in advance of the latter, pivoted retainer-levers having upwardly-opening hooks engaging the slidable frame, and springs to force said slidable frame forward when released from said retainer-levers.

2. In a vehicle-fender, the combination of a relatively stationary frame secured to the vehicle; a slidable frame beneath said stationary frame and projecting in advance of the latter, guide-rods on which said slidable frame is guided, pivoted retainer-levers having automatically-detachable connection with said slidable frame, and springs surrounding said guide-rods and bearing at one of their ends against said slidable frame to project the same forward when said retainer-levers are disengaged therefrom.

3. In a vehicle-fender, the combination of a relatively stationary frame pivotally secured to a vehicle to permit of swinging said frame upward, a guide-rod at each side and underneath said frame, a slidable frame having hollow side bars into which said guide-rods enter, a spring surrounding each guide-rod and acting against said slidable frame to force the same forward, and automatically-releasable retaining means normally holding said slidable frame in its rear position and adapted to be released when said slidable frame is suddenly forced rearward by contact with an object in the path of the vehicle.

4. In a vehicle-fender, the combination of a relatively stationary frame pivotally secured to a vehicle to permit of swinging said frame upward, a guide-rod at each side and underneath said frame, a slidable frame having hollow side bars into which said guide-rods enter, a spring surrounding each guide-rod and acting against said slidable frame to force the same forward, and retainer-levers pivotally attached to the stationary frame and inclined downward and forward, said retainer-levers having hooks at their forward ends engaging the slidable frame.

5. In a vehicle-fender, the combination of a relatively stationary frame comprising side bars, a front cross-bar and a rear cross-bar, and having the space within said frame occupied by a flexible material, a guide-rod secured to said frame at each side and extending forward beneath the same, a guide secured to each side bar of said frame near the front end thereof, a slidable frame comprising a front cross-bar, a rear cross-bar, and hollow side bars guided in said guides and receiving the forward ends of said guide-rods, said slidable frame having a flexible material occupying the space between the bars forming the frame, springs surrounding the guide-rods and bearing with their front ends against said slidable frame, and retainer-levers pivotally secured to the rear cross-bar of the stationary frame and having upwardly-opening hooks at their forward ends engaging the rear cross-bar of the slidable frame.

6. In a vehicle-fender, the combination of a relatively stationary frame having curved side bars, a slidable frame beneath said stationary frame and projecting slightly in advance of the stationary frame, said slidable frame having also curved side bars, means for retaining said slidable frame in its rear position, and means for forcing the slidable frame forward when released from said retaining means, said fender forming a basket-like receptacle when the slidable frame is forced into its forward position.

In testimony whereof I have affixed my signature in the presence of two subscribing witnesses.

FREDRICK ROEDER.

Witnesses:
 ADDISON P. TRIMM,
 EMIL NEUHART.